June 8, 1948. E. R. GERBER 2,443,031
CORN SHELLER

Filed Nov. 7, 1945 2 Sheets-Sheet 1

Inventor:
Edward R. Gerber.
By Paul O. Pippel
Atty.

June 8, 1948.  E. R. GERBER  2,443,031
CORN SHELLER
Filed Nov. 7, 1945  2 Sheets-Sheet 2
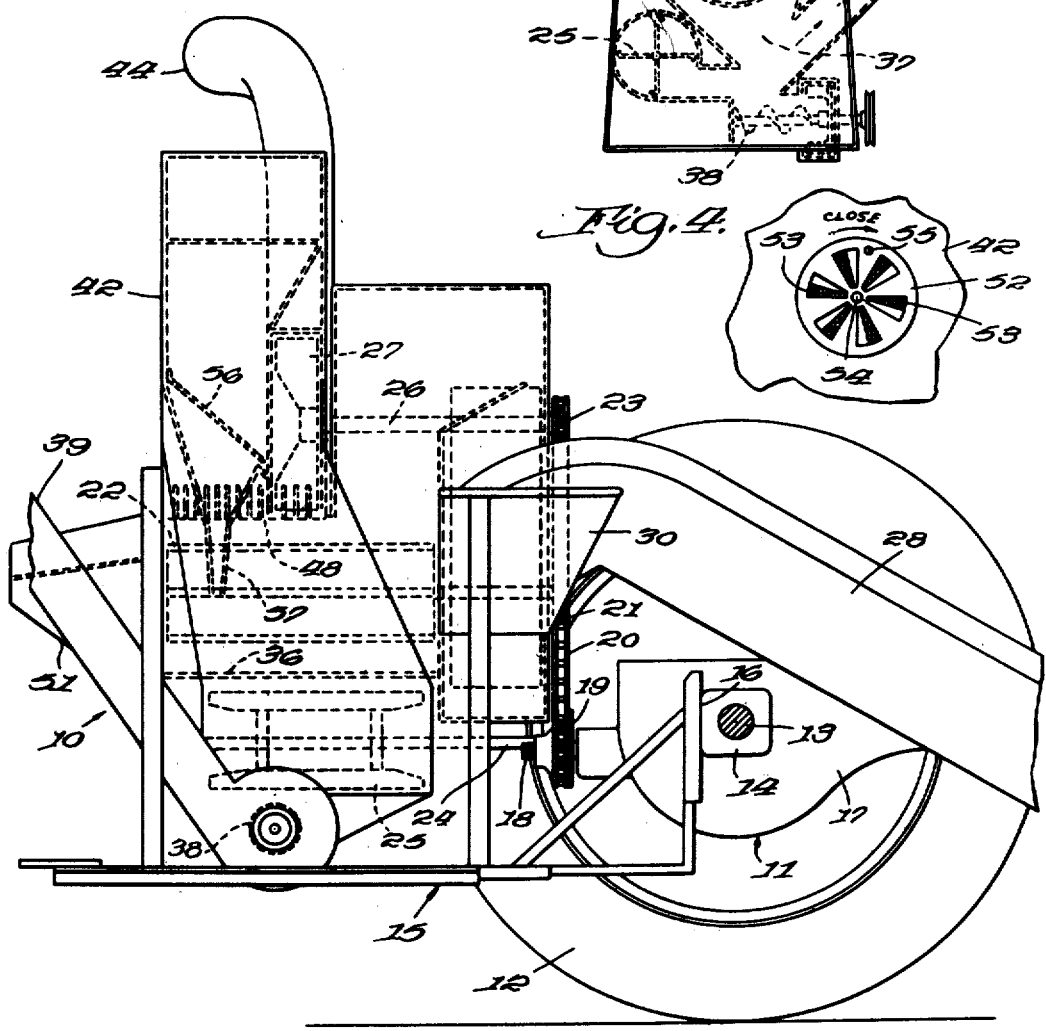
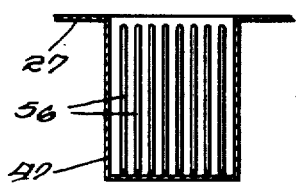
Inventor:
Edward R. Gerber.
By Paul O. Pippel,
Atty.

Patented June 8, 1948

2,443,031

UNITED STATES PATENT OFFICE 2,443,031

CORN SHELLER

Edward R. Gerber, Chicago, Ill., assignor to International Harvester Company, a corporation of New Jersey Application November 7, 1945, Serial No. 627,200

2 Claims. (Cl. 130—6)

This invention relates to a new and improved corn sheller and has for one of its principal objects the provision of means for removing husks from the corn shelling chamber with a minimum loss of corn.

An important object of this invention is to provide a suction-type husk removing means for corn shellers which is so designed that clogging of the discharge and corn removal from the shelling chamber through the husk discharge are almost non-existent.

Another important object of this invention is the provision of a corn shelling attachment for corn pickers.

Another and further important object of this invention is the provision of a novel corn sheller which is especially adapted and suited for attachment and cooperation with a two-row tractor-mounted corn picker.

A still further important object of this invention is to provide a husk removing mechanism for corn shellers combining husk removing rolls and suction means.

Another and still further object of this invention is to provide a suction-type husk removing means for a corn sheller which is supplemented by the regular corn cleaning fan.

Other and further important objects of this invention will become apparent from the disclosure in the following specification and accompanying drawings in which:

Figure 2 is a side elevation of the device as shown in Figure 1;

Figure 3 is a sectional view taken through a modified form of corn sheller;

Figure 4 is a plan view of a valve employed in the device shown in Figure 3; and Figure 5 is a sectional view taken on the line 5—5 of Figure 1.

As shown in the drawings:

Figure 1:
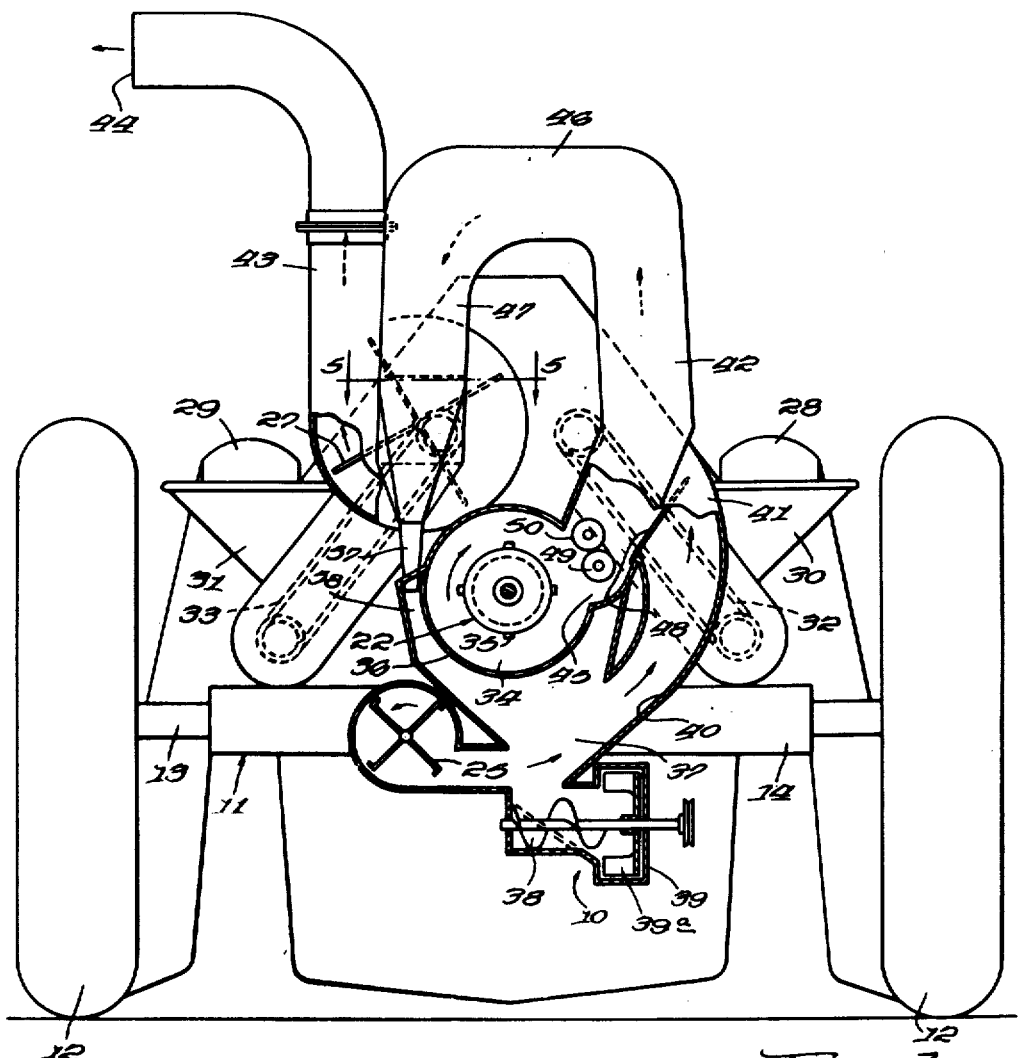
Figure 1 is an end view of a tractor-mounted corn picker having the corn shelling attachment of this invention incorporated therein.

Reference numeral 10 indicates generally a corn sheller mounted on the rear of a tractor 11. The tractor is of the type having a narrow longitudinal body portion and a pair of wide spread rear wheels 12. A rear axle 13 is journaled for rotation within the rear axle housing 14, and as best shown in Figure 2, the axle housing supports a frame structure 15 and 16. The corn sheller 10 is mounted directly on top of the frame 15. The tractor 11 having a chassis 17 is equipped with a rear power take-off shaft 18 which is connected by means of a sprocket 19 and a chain 20 to a sprocket 21 adapted to directly drive a corn shelling cylinder 22. The chain 20 additionally runs around a sprocket 23 and a sprocket not shown but mounted on the end of a shaft 24 which drives a cleaning fan 25. The sprocket 23 is attached to a shaft 26 upon which is mounted a fan 27 adapted to create the suction for the removal of corn husks in this device.

The corn in the fields is picked by regular gathering units 28 and 29. These gathering units discharge the snapped ears of corn into hoppers 30 and 31, respectively. Endless conveyors 32 and 33 are adapted to carry the ears of corn from the hoppers 30 and 31 upwardly and centrally of the corn sheller to a point where the elevators will discharge the ears of corn into a shelling chamber 34 occupied by the shelling cylinder 22.

The shelling cylinder 22 is relatively standard and is equipped with nubs 35 which act to remove husks and kernels of corn from the cob. This shelling action relies on the chamber 34 being filled with ears of corn and their rubbing against one another. The lower portion of the chamber 34 is equipped with a concave or screen member 36 through which the shelled corn may drop through a cleaning chamber 37 in the sheller and thence downwardly to a cross-conveying auger 38 which carries the cleaned and shelled corn transversely of the corn sheller to an elevator 39 adapted to discharge in a trailing wagon or the like. A paddle wheel 39a is the impeller for the elevator 39 and is positioned adjacent the discharge end of the auger 38.

The shape of the cleaning chamber 37 is so designed that the fan 25 will cause an air current to pass upwardly therethrough in an arcuate manner following a curved wall 40. Chaff, dirt, and other foreign matter which falls through the perforated concave 36 is lighter than the kernels of corn, and the above mentioned air current will carry this lighter foreign matter upwardly through a conduit 41 joining a vertical conduit 42 which extends a considerable distance above the shelling chamber and then passes over and downwardly to communicate with the suction fan 27 which has a discharge conduit 43 and an outlet 44.

The vertical conduit 42 projects downwardly to the upper portion of the shelling chamber 34 at 45. The fan 27 causes a suction on the shelling chamber 34 at the juncture 45 between the chamber and the conduit 42. As the husks are torn loose from the ears of corn, they are adapted to be drawn upwardly through the conduit 42 and thence out the fan discharge 43. The purpose of the upwardly extending vertical conduit 42 is to prevent the fan 27 from drawing out kernels of corn. The husks will be carried up the conduit 42 by the suction created by the fan and will continue to be so carried across a transverse portion 46 of the conduit 42 and thence downwardly through a vertical portion 47 to its contact with the fan 27. When kernels of corn are drawn upwardly through the conduit 42, they are sufficiently heavy so that the great height of the conduit is too much of an obstacle to be overcome and the kernels will eventually drop down back into the shelling chamber 34 along the curved portion 48 of the conduit 42. This curved portion 48, as best shown in Figure 2, is in the form of a comb or series of fingers which permit a constant stream of air to be drawn upwardly therethrough, and at no time will the returning corn tend to clog up the air supply for the suction fan 27. There are times when the cobs get up into the conduit 42 and they too will come down past the comb member 48 and into the shelling chamber 34.

If any corn is drawn over the top portion 46 of the suction discharge conduit and down into the vertical portion 47 provision is made to save it and return it to the cleaning chamber 37. As best shown in Figures 1 and 5, a plurality of spaced fingers 56 are inclined in the bottom of the vertical portion 47 of the discharge conduit so that kernels of corn may drop directly therethrough to a restricted conduit 57. This small conduit 57 discharges into an upper extension 58 of the cleaning chamber 37. The fingers have open unsupported lower ends adjacent the opening into the suction fan 27. When husks or other material falls on the finger grate they are prevented from passing therethrough by their relative close position. The suction fan 27, however, pulls the husks down the inclined fingers into the fan where it is discharged as trash. The reason for having the conduit 57 rather small and restricted is to prevent the fan 27 from creating any effective suction in it which would prevent the corn from freely falling.

In order to start the husks moving up the conduit 42, a pair of cooperative husk-removing rolls 49 and 50 is adapted to keep the husks moving from the shelling chamber 34 into the path of the suction in the conduit 42. It is apparent then that these rolls 49 and 50 act to agitate the husks in the chamber 34 as well as remove husks which have heretofore remained on the ears of corn. These same rolls 49 and 50 also act to prevent a mass movement of stripped cobs up into the conduit 42. The discharge of the stripped cobs is at the ends 51 of the corn shelling unit.

The comb member or series of fingers 48 prevents congestion in the suction conduit 42. However, a second means for supplying a constant stream of air to the conduit 42 is provided, thus relieving the comb member 48. The cleaning fan stream of air, as previously stated, joins the conduit 42 above the husk-removing rolls 49 and 50, and hence congestion at the mouth 45 between the shelling chamber 34 and the conduit 42 will not halt suction in the conduit 42. Use of both the comb 48 and the combining of the cleaning fan air stream guarantees continuous uninterrupted suction in the conduit 42, and hence the husks are discharged as fast as they are removed from the ears. The suction fan 27 draws air from the shelling chamber 34 and from the cleaning fan stream of air. It is obvious that the auxiliary air supply shown as coming from the cleaning fan 25 may be taken directly from the atmosphere in the form of a screen having a variable shutter as shown in the modification of Figure 3. At any rate, the supply of air from the shelling chamber 34 and the auxiliary supply of air must be so balanced that there is not sufficient suction at the mouth 45 so that all material in the shelling chamber would be carried out through the suction fan 27. The suction on the husk exit 45 must be only great enough to raise and carry out husks and not shelled corn and cobs. The admittance of an auxiliary supply of air to the suction conduit 42 sufficiently reduces the suction at the point of husk discharge causing cobs and kernels of corn to fall back down the comb member 48 into the shelling chamber 34.

In the modified device shown in Figure 3 in which the cleaning chamber discharge air does not join with the husk removing conduit, a series of screened passages 53 to the atmosphere in the suction conduit 42 are equipped with an adjustable shutter 52 capable of admitting more or less air to the conduit 42 depending on the amount of suction required at the husk discharge exit 45. The shutter 52 is shown in greater detail in Figure 4. The shutter is disk shaped and journaled for rotation at its center 54. A series of radial slots may be alined or partially alined with the screened passages 53 to admit more or less air merely by rotating the disk 52 by its handle 55 around its central pivot 54. The user of the corn sheller can determine the amount of opening necessary by examining the material being discharged through the outlet 44. If there are husks and kernels coming out of this opening, then the suction at the husk removing rolls 49 and 50 is too great and the shutter 52 is opened to a greater extent thus reducing the suction at the rolls 49 and 50. It is very necessary, however, that not too much air be admitted through the auxiliary air supply 53 because eventually the husks will not be removed for lack of sufficient suction. The balancing between the main and auxiliary air supplies is thus very essential.

In the modified device of Figure 3, the cleaning fan and its created stream of air discharge directly to the atmosphere at 56 separately from the suction fan discharge 43. However, as the device is shown in Figures 1 and 2, the suction fan 27, in combination with the blowing of the cleaning fan, causes the husks, dirt, chaff, and all foreign matter found in connection with the shelling of corn to be carried upwardly through the conduit 42 and discharged through the suction fan outlet 44. The removal of all this material is therefore controlled by movement of the single discharge spout 44.

The corn sheller of this invention is especially adapted to tractor-mounted corn pickers of the two-row type. However, it is obvious that the sheller may be used separately from the corn picker and incorporate the same features. Numerous details of construction may be varied throughout a wide range without departing from the principles disclosed herein, and I do not therefore propose limiting the patent granted thereon otherwise than as necessitated by the appended claims.

What is claimed is:

1. A corn sheller having a shelling chamber, a screen beneath said chamber for passing shelled corn, a cleaning chamber beneath said screen, a fan adjacent said cleaning chamber adapted to project a stream of air through said cleaning chamber, said shelling chamber having a relatively wide opening adjacent the top thereof, husk removing means for said shelling chamber, said husk removing means including a pair of cooperative rolls positioned substantially centrally of said wide opening and a vertical conduit, a second fan associated with said vertical conduit extending upwardly from said rolls and enclosing said wide opening, for creating a suction in said conduit adapted to remove husks from the cooperative rolls as they are taken from the shelling chamber, and means for joining the stream of air passing through said cleaning chamber with said vertical conduit at a point spaced above the cooperative rolls whereby corn or cob particles taken out by the cooperative rolls are dropped back into the shelling chamber over the sides of the cooperative rolls and through the wide opening.

2. A corn sheller comprising a shelling chamber having an opening in the upper portion thereof, means for removing shelled corn from the bottom of said shelling chamber, husk removing means associated with the opening in said chamber, said husk removing means including a vertical conduit enclosing said opening in the shelling chamber and having an upwardly directed suction, husk removing rolls positioned in the opening between the shelling chamber and the suction conduit, said vertical conduit having an opening adjacent the husk removing rolls, and a comb member mounted in the conduit over said opening in the vertical conduit and projecting upwardly in said opening whereby cobs and kernels of corn are returned to the shelling chamber around and beneath the husk removing rolls as effective suction in this area is reduced by the comb member.

EDWARD R. GERBER.

REFERENCES CITED

The following references are of record in the file of this patent:

UNITED STATES PATENTS

| Number | Name | Date |
| --- | --- | --- |
| 1,588,637 | White | June 15, 1926 |
| 1,791,673 | Karlson et al. | Feb. 10, 1931 |
| 2,100,137 | Groves | Nov. 23, 1937 |
| 2,271,897 | Mast | Feb. 3, 1942 |
| 2,344,235 | Crumb et al. | Mar. 14, 1944 |
| 2,380,295 | Crumb et al. | July 10, 1945 |

Certificate of Correction

Patent No. 2,443,031.  June 8, 1948.

EDWARD R. GERBER

It is hereby certified that errors appear in the printed specification of the above numbered patent requiring correction as follows: Column 5, line 6, after the syllable "duit" and before the comma, insert *extending upwardly from said rolls and enclosing said wide opening*; lines 7 and 8, strike out the words and comma "extending upwardly from said rolls and enclosing said wide opening,"; and that the said Letters Patent should be read with these corrections therein that the same may conform to the record of the case in the Patent Office.

Signed and sealed this 12th day of October, A. D. 1948.

[SEAL]

THOMAS F. MURPHY,
*Assistant Commissioner of Patents.* tively wide opening adjacent the top thereof, husk removing means for said shelling chamber, said husk removing means including a pair of cooperative rolls positioned substantially centrally of said wide opening and a vertical conduit, a second fan associated with said vertical conduit extending upwardly from said rolls and enclosing said wide opening, for creating a suction in said conduit adapted to remove husks from the cooperative rolls as they are taken from the shelling chamber, and means for joining the stream of air passing through said cleaning chamber with said vertical conduit at a point spaced above the cooperative rolls whereby corn or cob particles taken out by the cooperative rolls are dropped back into the shelling chamber over the sides of the cooperative rolls and through the wide opening.

2. A corn sheller comprising a shelling chamber having an opening in the upper portion thereof, means for removing shelled corn from the bottom of said shelling chamber, husk removing means associated with the opening in said chamber, said husk removing means including a vertical conduit enclosing said opening in the shelling chamber and having an upwardly directed suction, husk removing rolls positioned in the opening between the shelling chamber and the suction conduit, said vertical conduit having an opening adjacent the husk removing rolls, and a comb member mounted in the conduit over said opening in the vertical conduit and projecting upwardly in said opening whereby cobs and kernels of corn are returned to the shelling chamber around and beneath the husk removing rolls as effective suction in this area is reduced by the comb member.

EDWARD R. GERBER.

REFERENCES CITED

The following references are of record in the file of this patent:

UNITED STATES PATENTS

| Number | Name | Date |
|---|---|---|
| 1,588,637 | White | June 15, 1926 |
| 1,791,673 | Karlson et al. | Feb. 10, 1931 |
| 2,100,137 | Groves | Nov. 23, 1937 |
| 2,271,897 | Mast | Feb. 3, 1942 |
| 2,344,235 | Crumb et al. | Mar. 14, 1944 |
| 2,380,295 | Crumb et al. | July 10, 1945 |

---

Certificate of Correction

Patent No. 2,443,031. June 8, 1948.

EDWARD R. GERBER

It is hereby certified that errors appear in the printed specification of the above numbered patent requiring correction as follows: Column 5, line 6, after the syllable "duit" and before the comma, insert *extending upwardly from said rolls and enclosing said wide opening*; lines 7 and 8, strike out the words and comma "extending upwardly from said rolls and enclosing said wide opening,"; and that the said Letters Patent should be read with these corrections therein that the same may conform to the record of the case in the Patent Office.

Signed and sealed this 12th day of October, A. D. 1948.

[SEAL]

THOMAS F. MURPHY,
*Assistant Commissioner of Patents.*